(12) United States Patent
Wu et al.

(10) Patent No.: US 10,985,605 B2
(45) Date of Patent: Apr. 20, 2021

(54) POWER MANAGEMENT CIRCUIT AND ELECTRONIC DEVICE THEREOF AND POWER SUPPLY METHOD THEREOF

(71) Applicant: ASUSTeK COMPUTER INC., Taipei (TW)

(72) Inventors: Tsung-Han Wu, Taipei (TW); Ming-Ting Tsai, Taipei (TW); Wei-Gen Chung, Taipei (TW); Hsi-Ho Hsu, Taipei (TW); Chen-Hao Yu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/512,500

(22) Filed: Jul. 16, 2019

(65) Prior Publication Data

US 2020/0036220 A1   Jan. 30, 2020

Related U.S. Application Data

(60) Provisional application No. 62/703,906, filed on Jul. 27, 2018.

(30) Foreign Application Priority Data

Jun. 21, 2019   (TW) ................................ 108121843

(51) Int. Cl.
*H02J 9/06*     (2006.01)
*H02J 7/34*     (2006.01)
(Continued)

(52) U.S. Cl.
CPC ............. *H02J 9/061* (2013.01); *G06F 1/305* (2013.01); *H02J 1/14* (2013.01); *H02J 7/0047* (2013.01);
(Continued)

(58) Field of Classification Search
CPC ...... H02J 9/061; H02J 7/34; H02J 1/14; H02J 7/0068; H02J 7/0047; H02J 7/0049;
(Continued)

(56) References Cited

U.S. PATENT DOCUMENTS 10,399,442 B2 * 9/2019 Harada ................. B60L 3/0084

FOREIGN PATENT DOCUMENTS

| CN | 107482755 A | 12/2017 |
|---|---|---|
| CN | 207265705 U | 4/2018 |

* cited by examiner

*Primary Examiner* — John W Poos
(74) *Attorney, Agent, or Firm* — McClure, Qualey & Rodack, LLP

(57) ABSTRACT

A power management method includes: determining, by a control circuit, whether a first connector is connected to a first power supply and whether a second connector is connected to a second power supply. The method further includes: controlling, by the control circuit, a first conversion circuit to supply power to a battery unit and a system circuit, and computing a second fully-charged condition that is less than a first fully-charged condition when a determining result is yes. The method also includes: determining, by the control circuit, whether power information of the battery unit reaches the second fully-charged condition, and controlling, by the control circuit, a second conversion circuit to convert a second power from the second connector according to the second fully-charged condition, to supply power to the battery unit and the system circuit. A related circuit and electronic device are also provided.

10 Claims, 7 Drawing Sheets

(51) Int. Cl.
*H02J 1/14* (2006.01)
*H02J 7/00* (2006.01)
*G06F 1/30* (2006.01)

(52) U.S. Cl.
CPC .............. *H02J 7/0068* (2013.01); *H02J 7/34* (2013.01); *H02J 7/0049* (2020.01); *H02J 2300/30* (2020.01)

(58) Field of Classification Search
CPC .. H02J 2300/30; H02J 2207/30; H02J 7/0048; H02J 7/007; H02J 1/102
See application file for complete search history.

POWER MANAGEMENT CIRCUIT AND ELECTRONIC DEVICE THEREOF AND POWER SUPPLY METHOD THEREOF

CROSS-REFERENCE TO RELATED APPLICATION

This application claims the priority benefit of U.S. Provisional Application Ser. No. 62/703,906, filed on Jul. 27, 2018 and TW application serial No. 108121843, filed on Jun. 21, 2019. The entirety of the above-mentioned patent application is hereby incorporated by reference herein and made a part of the specification.

BACKGROUND OF THE INVENTION

Field of the Invention

The disclosure relates to a power management circuit, an electronic device thereof, and a power supply method thereof.

Description of the Related Art

A mobile device includes a power supply storage function, and a user charges the mobile device to use the mobile device at any time. However, a charging architecture of the mobile device is extremely complicated. The charging architecture includes redundant and unnecessary components and lack of flexibility in power supply selection, which results in difficulty in designing the charging architecture, excessive production costs, and inconvenience in use.

BRIEF SUMMARY OF THE INVENTION

The disclosure provides a power management circuit applicable to an electronic device, including a first conversion circuit, a second conversion circuit, a sensing circuit, and a control circuit. The first conversion circuit is coupled between a first connector of the electronic device and a system circuit of the electronic device, where, the first conversion circuit is coupled between the first connector and a battery unit of the electronic device via a node, and the first conversion circuit is configured to convert a first power from the first connector to supply power to the battery unit and the system circuit. The second conversion circuit is coupled between a second connector and the system circuit of the electronic device, where the second conversion circuit is coupled between the second connector and the battery unit, via a node, and the second conversion circuit is configured to convert a second power from the second connector to supply power to the battery unit and the system circuit. The sensing circuit is coupled between the node and the battery unit. The control circuit is coupled to the first connector, the second connector, the first conversion circuit, and the second conversion circuit. When the first connector is connected to a first power supply to the electronic device, and the second connector is connected to a second power supply to the electronic device, the control circuit controls the first conversion circuit to supply power to the system circuit, and controls the first conversion circuit to supply power to the battery unit according to a first fully-charged condition, and the control circuit computes a second fully-charged condition that is less than the first fully-charged condition. When power information of the battery unit does not reach the second fully-charged condition, the control circuit controls the second conversion circuit to supply power to the system circuit and the battery unit according to the second fully-charged condition, so that the second conversion circuit and the first conversion circuit jointly supply power to the battery unit and the system circuit.

The disclosure further provides an electronic device, including: a battery unit, a connector, a second connector, a system circuit, a first conversion circuit, a second conversion circuit, a sensing circuit, and a control circuit. The battery unit is configured to output a battery power. The first connector is configured to receive a first power from a first power supply, the second connector is configured to receive a second power from a second power supply, and the system circuit operates according to any one of the battery power, the first power, and the second power. The first conversion circuit is coupled between the first connector and the system circuit, and is coupled between the first connector and the battery unit, the first conversion circuit is coupled to the battery unit via a node, and the first conversion circuit is configured to convert the first power to supply power to the battery unit and the system circuit. The second conversion circuit is coupled between the second connector, and the system circuit and is coupled between the second connector and the battery unit, the second conversion circuit is coupled to the battery unit via the foregoing node, and the second conversion circuit is configured to convert the second power to supply power to the battery unit and the system circuit. The sensing circuit is coupled between the node and the battery unit. The control circuit is coupled to the first connector, the second connector, the first conversion circuit, and the second conversion circuit. When the first connector is connected to the first power supply and the second connector is connected to the second power supply, the control circuit controls the first conversion circuit to supply power to the system circuit, and controls the first conversion circuit to supply power to the battery unit according to a first fully-charged condition, and the control circuit computes a second fully-charged condition that is less than the first fully-charged condition. When power information of the battery unit does not reach the second fully-charged condition, the control circuit controls the second conversion circuit to supply power to the system circuit and the battery unit according to the second fully-charged condition, so that the second conversion circuit and the first conversion circuit jointly supply power to the battery unit and the system circuit.

The disclosure further provides a power supply method, including: determining, by the control circuit, whether a first connector is connected to a first power supply to an electronic device and whether a second connector is connected to a second power supply to the electronic device by a control circuit; when the first connector is connected to the first power supply and the second connector is connected to the second power supply, controlling, by the control circuit, a first conversion circuit to convert the first power from the first connector according to a first fully-charged condition, to supply power to a battery unit and a system circuit; when the first connector is connected to the first power supply and the second connector is connected to the second power supply, computing, by the control circuit, a second fully-charged condition that is less than the first fully-charged condition, determining, by the control circuit, whether power information of the battery unit reaches the second fully-charged condition, and controlling, by the control circuit, the second conversion circuit to convert the second power from the second connector according to the second fully-charged condition, to supply power to the battery unit and the system circuit when the power information does not reach the second fully-charged condition, so that the second conversion circuit and the first conversion circuit jointly supply power to the battery unit and the system circuit.

DETAILED DESCRIPTION OF THE EMBODIMENTS

Figure 1:
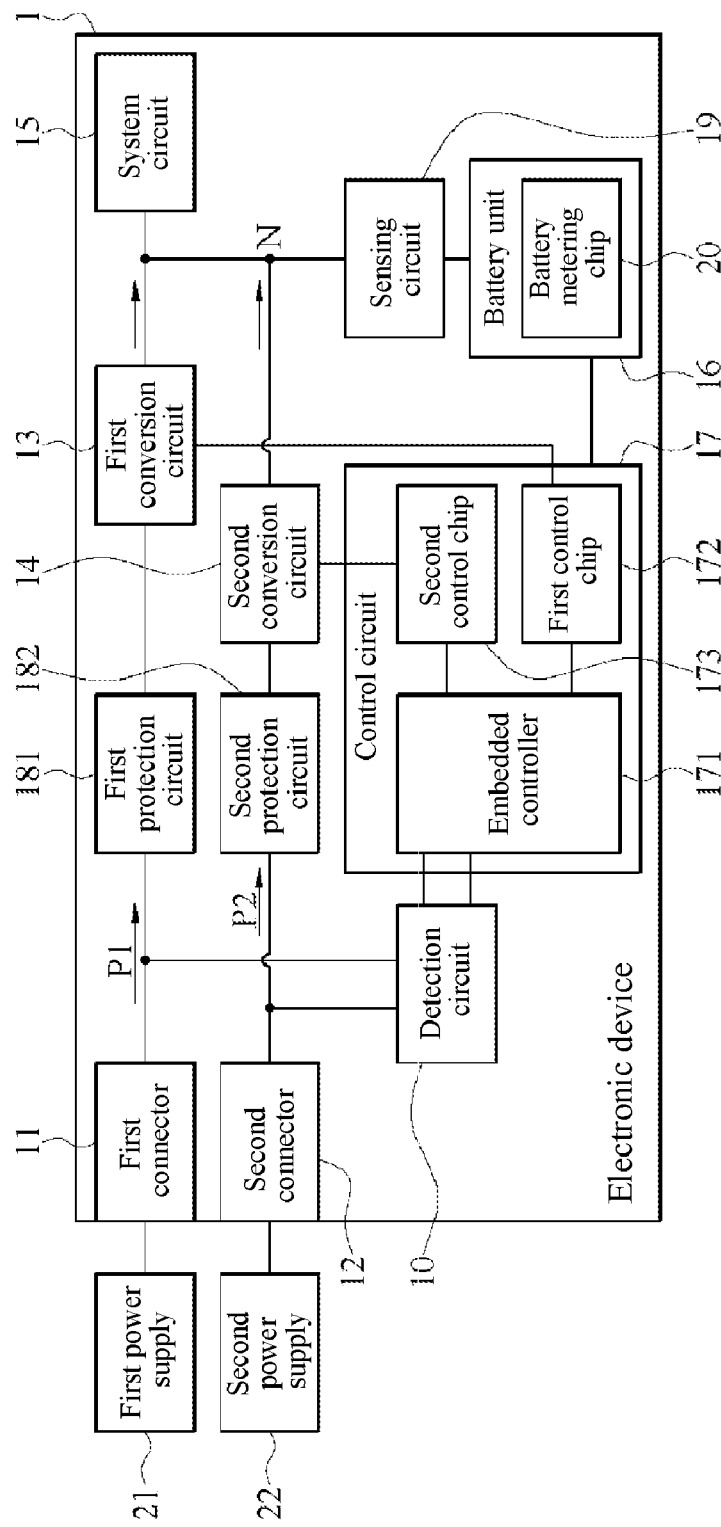
FIG. 1 is a schematic block diagram of an embodiment of an electronic device according to the disclosure.

FIG. 1 is a schematic block diagram of an embodiment of an electronic device 1 according to the disclosure. Referring to FIG. 1, the electronic device 1 is connected to two external power supplies 21 and 22 (which are referred to as a first power supply 21 and a second power supply 22 below). When the electronic device 1 is connected to the first power supply 21 and the second power supply 22, the electronic device 1 receives a power P1 (which is referred to as a first power P1 below) supplied by the first power supply 21, and the electronic device 1 operates according to the first power P1, and a battery unit 16 of the electronic device 1 is charged to a fully-charged state. However, when the first power P1 is insufficient to charge the battery unit 16 to a fully-charged state, in an embodiment, when the electronic device 1 runs a relatively power-hungry software or program, the electronic device 1 operates according to a power P2 (which is referred to as a second power P2 below) supplied by the second power supply 22, enables the battery unit 16 of the electronic device 1 to be charged to a fully-charged state, and supplies energy of the electronic device 1 to a system circuit 15 using a first conversion circuit 13. In an embodiment, the electronic device 1 is a notebook computer. In an embodiment, the foregoing power supplies 21 and 22 are a power adapter or a mobile power source.

In particular, the electronic device 1 includes two connectors 11 and 12 (which are referred to as a first connector 11 and a second connector 12 below), two conversion circuits 13 and 14 (which are referred to as a first conversion circuit 13 and a second conversion circuit 14 below), a system circuit 15, a battery unit 16, a control circuit 17, and a sensing circuit 19. The first conversion circuit 13 and the second conversion circuit 14 are connected to a node N on a power supply path, and the sensing circuit 19 is also connected to the node N. The sensing circuit 19 is coupled between the node N and the battery unit 16. The sensing circuit 19 senses, using a charging current flowing through the battery unit 16, a reference value of a charging current needed by the control circuit 17 to enable the first conversion circuit 13 and the second conversion circuit 14 to supply power. In an embodiment, the sensing circuit 19 is a sensing resistor or other chips with a current sensing capability.

The first conversion circuit 13 is coupled between the first connector 11 and the system circuit 15 and is coupled between the first connector 11 and the battery unit 16 to form a first power supply path. The second conversion circuit 14 is coupled between the second connector 12 and the system circuit 15 and is coupled between the second connector 12 and the battery unit 16 to form a second power supply path. The first connector 11 and the second connector 12 are respectively connected to the first power supply 21 and the second power supply 22. The first connector 11 receives a first power P1 from the first power supply 21, and transmits the first power P1 to the first conversion circuit 13. The second connector 12 receives a second power P2 from the second power supply 22, and transmits the second power P2 to the second conversion circuit 14. The first conversion circuit 13 converts the first power P1 to a voltage applicable to the system circuit 15 and the battery unit 16, and then supplies power to the system circuit 15 and the battery unit 16. The second conversion circuit 14 converts the second power P2 to a voltage applicable to the system circuit 15 and the battery unit 16, and then supplies power to the system circuit 15 and the battery unit 16.

The control circuit 17 is coupled to the first conversion circuit 13 and the second conversion circuit 14. The control circuit 17 enables the first conversion circuit 13 to convert the first power P1 to supply power to the system circuit 15 and the battery unit 16 when the first connector 11 is connected to the first power supply 21 and the second connector 12 is connected to the second power supply 22 (that is, the system circuit 15 and the battery unit 16 are powered via the first power supply path), and enables the second conversion circuit 14 to supply power to the system circuit 15 and the battery unit 16 according to the second power P2 when the first power P1 is insufficient to charge the battery unit 16 to a fully-charged state. In other words, the second conversion circuit 14 and the first conversion circuit 13 jointly supply power to the system circuit 15 and the battery unit 16 (that is, the system circuit 15 and the battery unit 16 are respectively powered via the first power supply path and the second power supply path).

Figure 2:
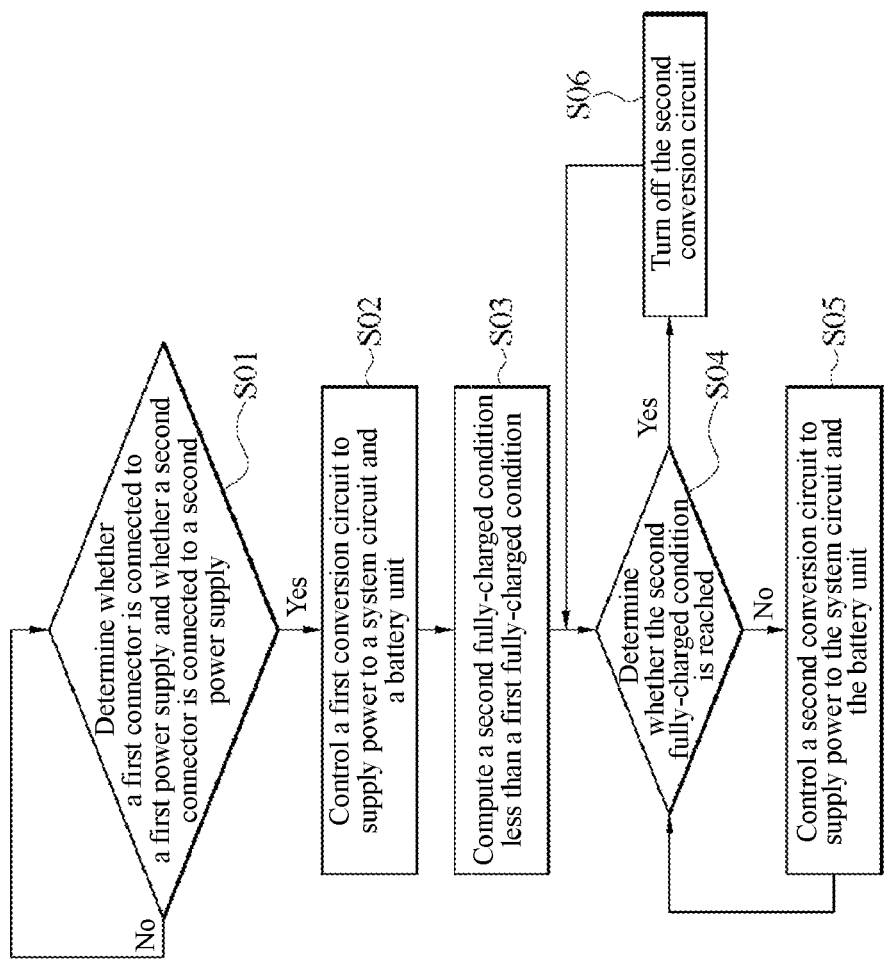
FIG. 2 is a flowchart of an embodiment of a power supply method according to the disclosure.

In particular, for operation, refer to FIG. 1 and FIG. 2. The control circuit 17 determines whether the first connector 11 is connected to the first power supply 21 and whether the second connector 12 is connected to the second power supply 22 (step S01). When the first connector 11 is connected to the first power supply 21 and the second connector 12 is connected to the second power supply 22 (a determining result is yes), the control circuit 17 enables the first conversion circuit 13 to supply power to the system circuit 15 according to the first power P1 (step S02), and enables the first converter circuit 13 to supply power to the battery unit 16 according to a fully-charged condition (which is referred to as a first fully-charged condition below). In addition, when the control circuit 17 determines that the first connector 11 is connected to the first power supply 21 and the second connector 12 is connected to the second power supply 22 (the determining result is yes), the control circuit 17 computes another fully-charged condition (which is referred to as a second fully-charged condition below) (step S03). Values of the second fully-charged condition are small than the first fully-charged condition. Then the control circuit 17 determines whether power information of the battery unit 16 reaches the second fully-charged condition (step S04). If the power information of the battery unit 16 does not reach the second fully-charged condition (a determining result is no), it indicates that the first power P1 is insufficient to charge the battery unit 16 to a fully-charged state. Then the control circuit 17 further enables the second conversion circuit 14 to supply power to the system circuit 15 and the battery unit 16 according to the second fully-charged condition (step S05), so that the system circuit 15 operates and the power information of the battery unit 16 reaches at least the second fully-charged condition.

In an embodiment, the electronic device 1 includes a power management circuit, the power management circuit including the foregoing conversion circuits 13 and 14, the sensing circuit 19, and the control circuit 17. On this basis, according to an embodiment of the power management circuit of the disclosure, the first conversion circuit 13 and the second conversion circuit 14 are jointly coupled to a same node N to share a same sensing circuit 19.

In an embodiment, after the control circuit 17 enables the second conversion circuit 14 to supply power to the system circuit 15 and the battery unit 16 according to the second fully-charged condition (step S05), the control circuit 17 performs step S04 again to determine whether the power information of the battery unit 16 reaches the second fully-charged condition. If the power information of the battery unit 16 has not reached the second fully-charged condition, the control circuit 17 does not turn off the second conversion circuit 14. When the power information of the battery unit 16 reaches the second fully-charged condition, the control circuit 17 turns off the second conversion circuit 14 to enable the second conversion circuit 14 to stop supplying power to the system circuit 15 and the battery unit 16 (step S06).

In an embodiment, as shown in FIG. 1, the electronic device 1 further includes a detecting circuit 10 and a battery metering chip (Gauge IC) 20. The control circuit 17 includes an embedded controller 171, a first control chip 172, and a second control chip 173. The detecting circuit 10 is coupled between the first connector 11 and the embedded controller 171, and is coupled between the second connector 12 and the embedded controller 171. The first control chip 172 is coupled between the embedded controller 171 and the first conversion circuit 13, and the second control chip 173 is coupled between the embedded controller 171 and the second conversion circuit 14.

The detecting circuit 10 detects whether the first connector 11 is connected to the first power supply 21, and detects whether the second connector 12 is connected to the second power supply 22. The embedded controller 171 determines, in step S01 according to a detection result generated by the foregoing detection operation, whether the first connector 11 is connected to the first power supply 21 and the second connector 12 is connected to the second power supply 22. In particular, when the detecting circuit 10 detects that the first connector 11 is connected to the first power supply 21, the detecting circuit 10 generates a confirmation signal (which is referred to as a first confirmation signal below), and the detecting circuit 10 sends the first confirmation signal to the embedded controller 171. When the detecting circuit 10 detects that the second connector 12 is connected to the second power supply 22, the detecting circuit 10 generates another confirmation signal (which referred to as a second confirmation signal below), and the detecting circuit 10 sends the second confirmation signal to the embedded controller 171.

Therefore, when the embedded controller 171 receives the first confirmation signal and the second confirmation signal from the detecting circuit 10, the embedded controller 171 obtains a determining result of yes in step S01 that the first connector 11 is connected to the first power supply 21 and the second connector 12 is connected to the second power supply 22. The embedded controller 171 sends the power information of the battery unit 16 received from the battery metering chip 20 and the first fully-charged condition to the first control chip 172, so that the first control chip 172 enables, according to the power information of the battery unit 16 and the first fully-charged condition, the first conversion circuit 13 to supply power to the battery unit 16. In an embodiment, the first fully-charged condition includes a fully-charged current value and a fully-charged voltage value. In an embodiment, the second fully-charged condition is one obtained by subtracting preset difference values from the fully-charged current value and the fully-charged voltage value of the first fully-charged condition respectively. The embedded controller 171 sends the power information of the battery unit 16 and the second fully-charged condition to the second control chip 173, so that the second control chip 173 supplies power to the system circuit 15 and the battery unit 16 according to the second fully-charged condition. In other words, the second control chip 173 turns off the second conversion circuit 14 when the power information of the battery unit 16 reaches the second fully-charged condition (step S06), and enables the second conversion circuit 14 to supply power to the system circuit 15 and the battery unit 16 when the power information of the battery unit 16 does not reach the second fully-charged condition (step S05). In an embodiment, the sensing circuit 19 senses, using a charging current flowing through the battery unit 16, a reference value of a charging current needed by the control chips 172 and 173 to enable the conversion circuits 13 and 14 to supply power.

In an embodiment, in step S03, the fully-charged voltage of the first fully-charged condition is 17 V, and the fully-charged current value is 3 A. The foregoing preset difference values are respectively 400 mV and 300 mA. The embedded controller 171 separately subtracts 400 mV and 300 mA from 17 V and 3 A to obtain the second fully-charged condition of 16.6 V and 2.7 A. The second control chip 173 enables, according to the second fully-charged condition, the second conversion circuit 14 to supply power to the system circuit 15 and the battery unit 16. The fully-charged voltage and the fully-charged current included in the foregoing first fully-charged condition have different voltage values and current values in different charging stages of the battery unit 16, and the fully-charged voltage and the fully-charged current included in the first fully-charged condition have different voltage values and current values depending on different models of the battery unit 16. On this basis, because the second fully-charged condition is related to the first fully-charged condition, the second control chip 173 also enables, according to different charging stages of the battery unit 16 and different models of the battery unit 16 correspondingly, the second conversion circuit 14 to supply power. In an embodiment, the foregoing preset difference values are preset to values of 10% of the fully-charged current value and the fully-charged voltage value or other fixed values.

In an embodiment, the first power supply 21 is an AC power adapter (AC adapter), and the first power supply 21 is designed based on the electronic device 1. The first power supply 21 outputs a first power P1 with a single wattage or volt, in an embodiment, 19 V, and the first conversion circuit 13 includes a buck converter (buck converter). Moreover, the second power supply 22 is a portable power adapter (a mobile power source) having a power delivery (power delivery, PD) function, and the second power supply 22 and the second connector 12 include a USB type-C communication transmission interface. On this basis, second power supplies 22 of different models or different brands output second power P2 with different wattages (such as 18 W, 30 W, 45 W, or 65 W), and the second conversion circuit 14 includes a buck-boost converter (buck-boost converter).

Figure 3:
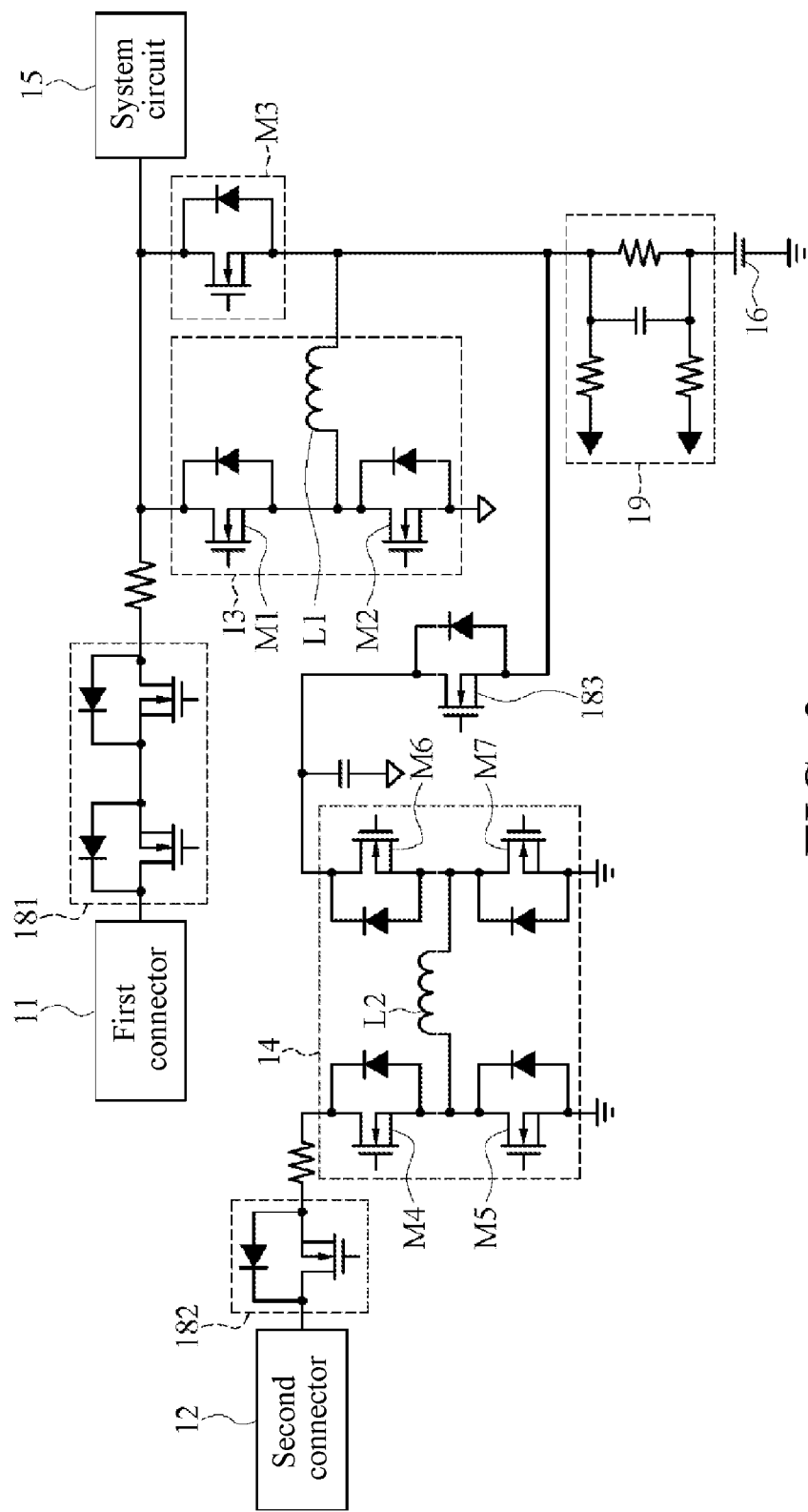
FIG. 3 is a circuit diagram of an implementation of a first conversion circuit, a second conversion circuit, and a sensing circuit in FIG. 1.
Figure 4:
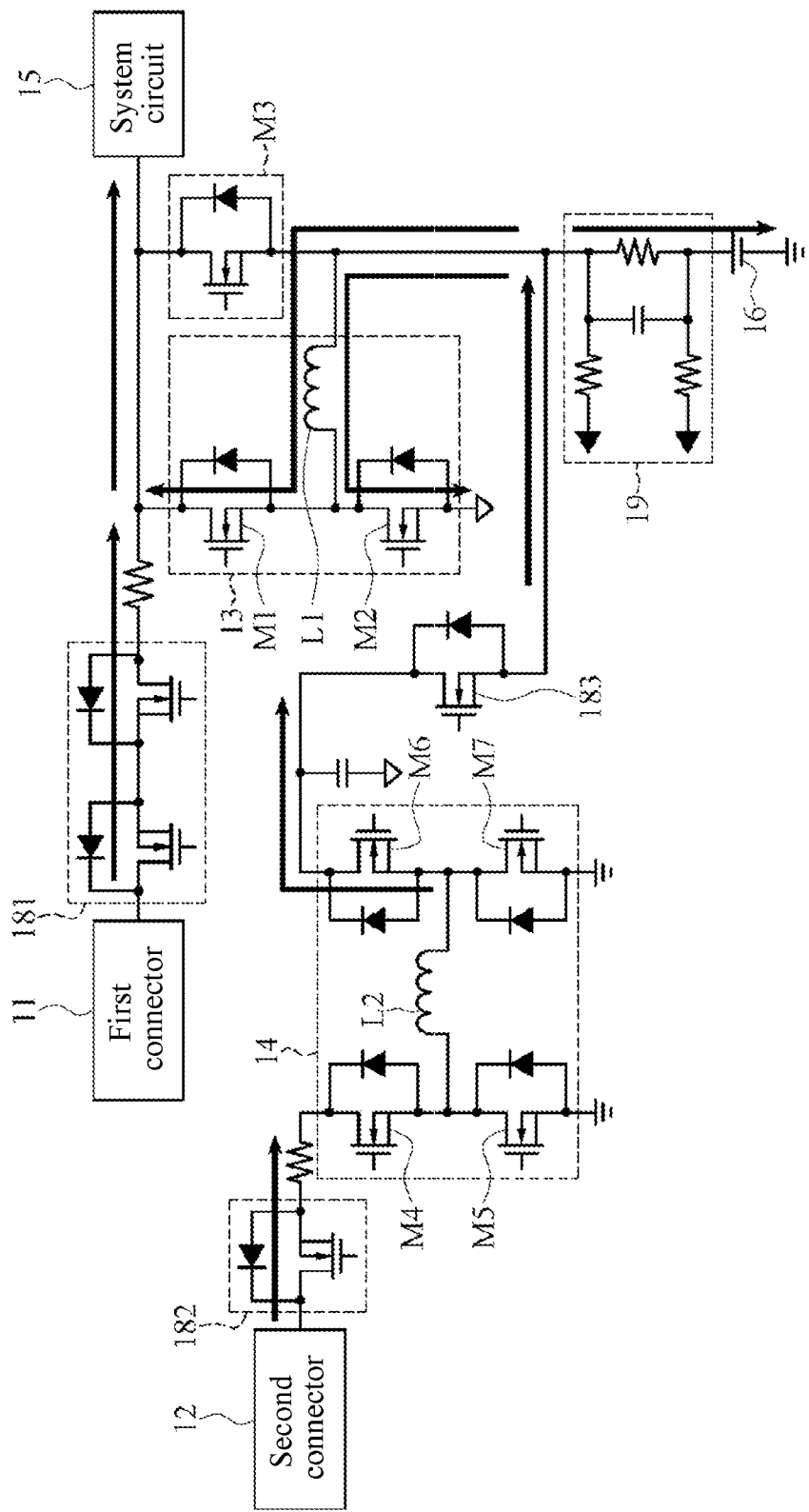
FIG. 4 is a schematic diagram of a path for a first conversion circuit and a second conversion circuit to supply power to a system circuit and a battery unit in FIG. 3.

Referring to FIG. 3 and FIG. 4, the first conversion circuit 13 including the buck converter includes changeover switches M1-M2 and an inductor L1. The changeover switches M1-M2 is controlled by the first control chip 172 to be in a turned-on or cut-off state. When the first connector 11 is not connected to the first power supply 21, the first control chip 172 controls the changeover switches M1-M2 to be cut off to turn off the first conversion circuit 13. When the first connector 11 is connected to the first power supply 21, the first control chip 172 computes, according to the power information of the foregoing battery unit 16, a first control signal to control the changeover switches M1 to M2 to be turned on, so that the first conversion circuit 13 performs buck conversion according to the first power P1 and then supplies power to the system circuit 15 and the battery unit 16. In addition, according to different power information of the battery unit 16 and different first fully-charged conditions, the first control chip 172 generates a first control signal having a corresponding duty cycle, so that the first conversion circuit 13 correspondingly supplies power to the system circuit 15 and the battery unit 16 according to the different power information and the different first fully-charged conditions.

Moreover, the second conversion circuit 14 including the buck-boost converter includes changeover switches M4-M7 and an inductor L2. The changeover switches M4-M7 is controlled by the second control chip 173 to be in a turned-on or cut-off state. When the second connector 12 is not connected to the second power supply 22, the second control chip 173 controls the changeover switches M4-M7 to be cut off to turn off the second conversion circuit 14. When the second connector 12 is connected to the second power supply 22, the second control chip 173 generates, according to the power information of the battery unit 16, a second control signal to control the changeover switches M4-M7 to be turned on, so that the second conversion circuit 14 performs buck-boost conversion according to the second power P2 and then supplies power to the system circuit 15 and the battery unit 16. In addition, according to different power information of the battery unit 16 and different second fully-charged conditions, the second control chip 173 generates a second control signal having a corresponding duty cycle, so that the second conversion circuit 14 correspondingly supplies power to the system circuit 15 and the battery unit 16 according to the different power information and the different second fully-charged conditions (that is, steps S05 and S06). In an embodiment, if the second control chip 173 determines that the power information reaches the second fully-charged condition, the second control chip 173 generates a second control signal having a duty cycle of zero to turn off the second conversion circuit 14.

In an embodiment, the first conversion circuit 13 and the second conversion circuit 14 separately supply power to the system circuit 15 and the battery unit 16. On this basis, the embedded controller 171 further determines whether the first connector 11 is connected to the first power supply 21 and whether the second connector 12 is not connected to the second power supply 22. If the embedded controller 171 receives the first confirmation signal generated by the detecting circuit 10 but does not receive the second confirmation signal, it indicates that the first connector 11 is connected to the first power supply 21 and the second connector 12 is not connected to the second power supply 22. In this case, the first control chip 172 enables the first conversion circuit 13 to supply power to the system circuit 15 and the battery unit 16, and the second control chip 173 does not turn on the second conversion circuit 14, that is, controls the second conversion circuit 14 to be turned off. On this basis, the embedded controller 171 sends a current power information of the battery unit 16 and the first fully-charged condition to the first control chip 172, so that the first control chip 172 enables the first conversion circuit 13 to supply power to the system circuit 15 and controls, according to the current power information of the battery unit 16 and the first fully-charged condition, the first conversion circuit 13 to supply power to the battery unit 16. A path for the first conversion circuit 13 to supply power is shown in FIG. 5.

Moreover, the embedded controller 171 further determines whether the first connector 11 is not connected to the first power supply 21 and whether the second connector 12 is connected to the second power supply 22. If the embedded controller 171 receives the second confirmation signal generated by the detecting circuit 10 but does not receive the first confirmation signal, it indicates that the first connector 11 is not connected to the first power supply 21 and the second connector 12 is connected to the second power supply 22. In this case, the second control chip 173 enables the second conversion circuit 14 to supply power to the system circuit 15 and the battery unit 16, and the first control chip 172 controls the first conversion circuit 13 to be turned off. On this basis, the embedded controller 171 sends the current power information of the battery unit 16 and the second fully-charged condition to the second control chip 173, so that the second control chip 173 enables the second conversion circuit 14 to supply power to the battery unit 16 according to the current power information of the battery unit 16 and the second fully-charged condition. A path for the second conversion circuit 14 to supply power is shown in FIG. 6.

Figure 5:
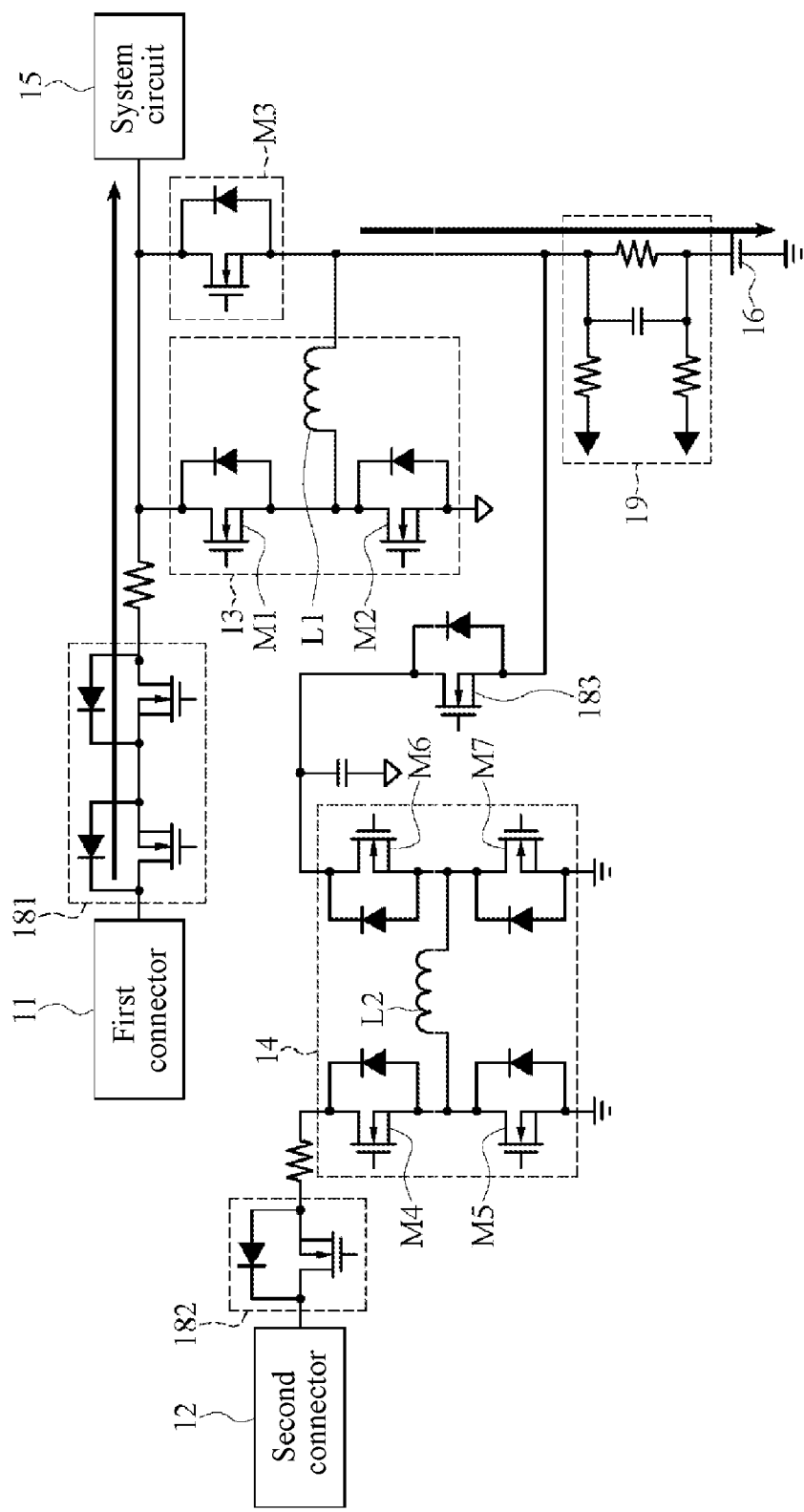
FIG. 5 is a schematic diagram of a path for a first conversion circuit to supply power to a system circuit and a battery unit in FIG. 3.
Figure 6:
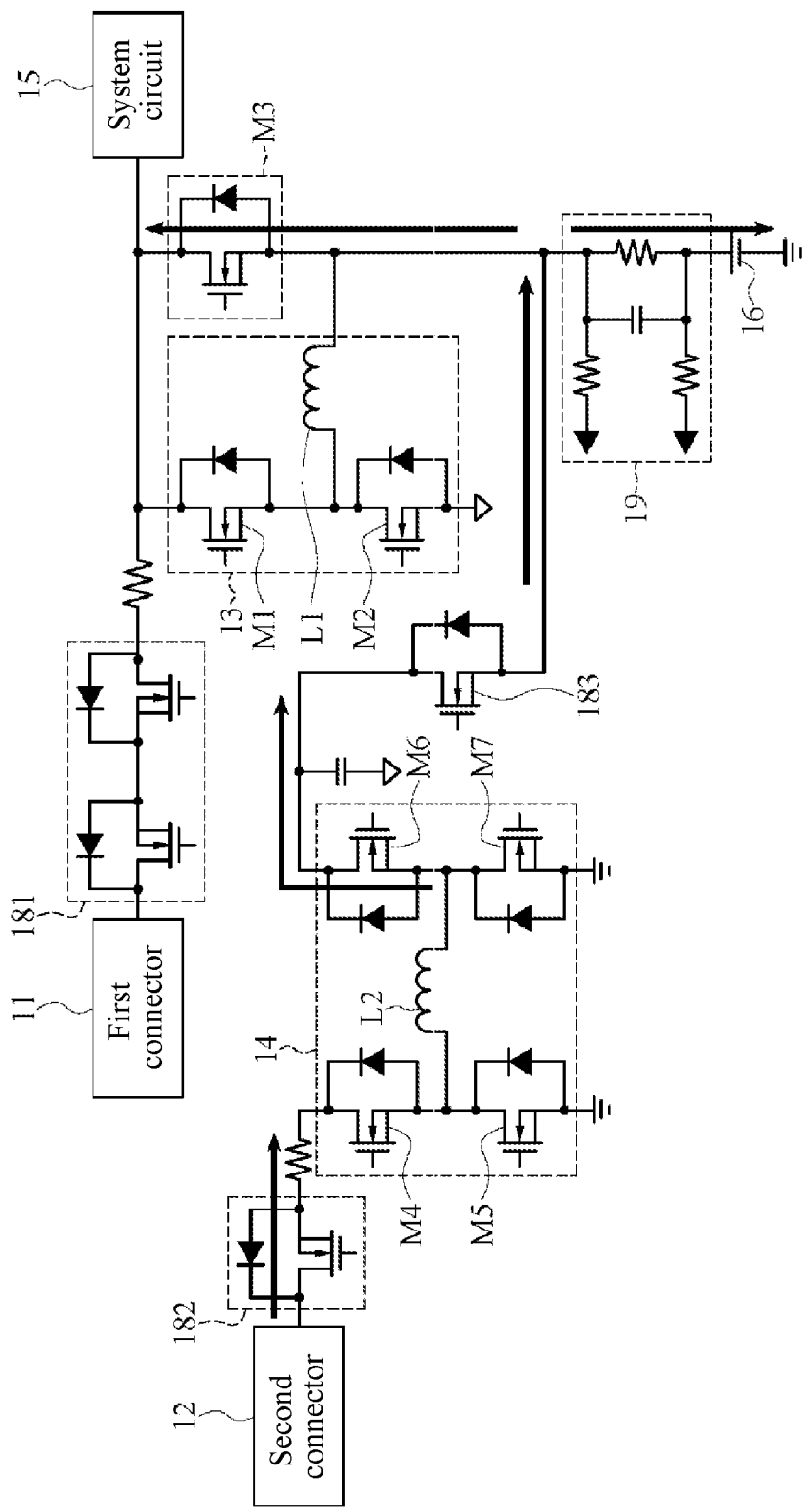
FIG. 6 is a schematic diagram of a path for a second conversion circuit to supply power to a system circuit and a battery unit in FIG. 3.
Figure 7:
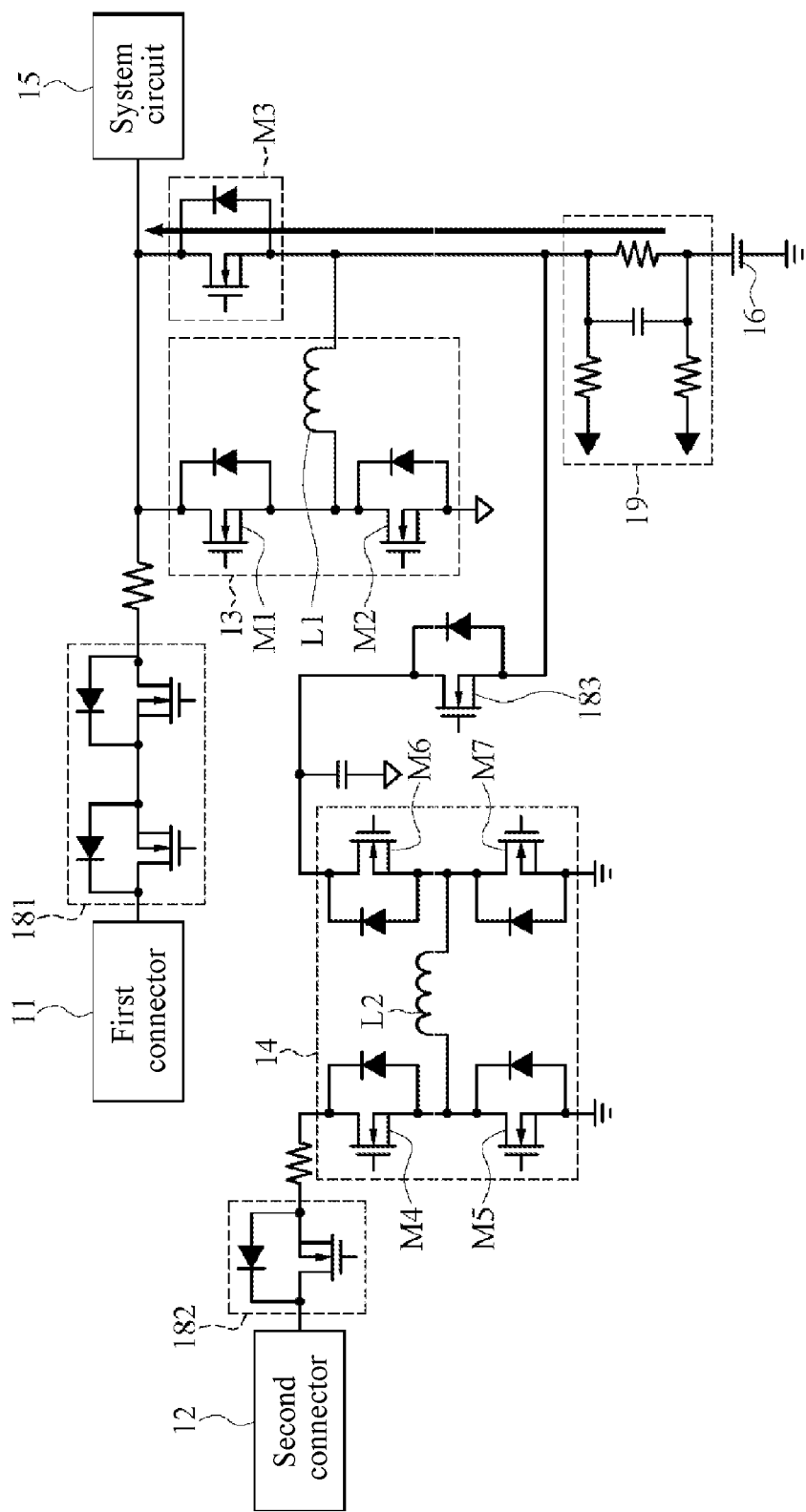
FIG. 7 is a schematic diagram of a path for a battery unit to supply power to a system circuit in FIG. 3.

In an embodiment, as shown in FIG. 3 to FIG. 7, the electronic device 1 further includes a power supply switch M3 coupled between the node N and the system circuit 15. The power supply switch M3 is controlled by the control circuit 17 to be turned on or cut off. In particular, when the first connector 11 is not connected to the first power supply 21 and the second connector 12 is not connected to the second power supply 22, it indicates that the electronic device 1 does not receive any external power. In this case, the battery unit 16 supplies power to the system circuit 15 for operation, the control circuit 17 controls the power supply switch M3 to be turned on, the battery unit 16 outputs a power (which is referred to as a battery power) stored therein, and the power supply switch M3 supplies the battery power from the battery unit 16 to the system circuit 15. A path for the power supply switch M3 to supply power is shown in FIG. 7. Moreover, when the first connector 11 is connected to the first power supply 21 and the second connector 12 is not connected to the second power supply 22, it indicates that the system circuit 15 is powered by the first conversion circuit 13 instead of the battery unit 16. In this case, the control circuit 17 controls the power supply switch M3 to be cut off. A path for the first conversion circuit 13 to supply power is shown in FIG. 5. Further, when the first connector 11 is not connected to the first power supply 21 and the second connector 12 is connected to the second power supply 22, it indicates that the system circuit 15 is powered by the second conversion circuit 14 instead of the first conversion circuit 13. In this case, the control circuit 17 controls the power supply switch M3 to be turned on, so that the second conversion circuit 14 supplies power to the system circuit 15 via the turned-on power supply switch M3, and a path for the second conversion circuit 14 to supply power is shown in FIG. 6. On this basis, the battery unit 16 and the second conversion circuit 14 share the power supply switch M3, and the power supply switch M3 transmits powers supplied by the battery unit 16 and the second conversion circuit 14 to the system circuit 15.

In an embodiment, as shown in FIG. 1 and FIG. 3 to FIG. 7, the electronic device 1 further includes a first protection circuit 181 and a second protection circuit 182. In an embodiment, the first protection circuit 181 and the second protection circuit 182 are one or a combination of ACFET, MOSFET, OVP IC or Load switch. The first protection circuit 181 is coupled between the first connector 11 and the first conversion circuit 13. The second protection circuit 182 is coupled between the second connector 12 and the second conversion circuit 14. When a voltage or a current received by the first connector 11 is greater than a critical value, the first protection circuit 181 is turned off to protect the first conversion circuit 13. When the voltage or the current received by the first connector 11 is less than the critical value, the protection circuit 181 is turned on, so that the first conversion circuit 13 receives the first power P1 from the first connector 11. Similarly, when a voltage or a current received by the second connector 12 is greater than a critical value, the second protection circuit 182 is turned off to protect the second conversion circuit 14. When the voltage or the current received by the second connector 12 is less than the critical value, the second protection circuit 182 is turned off, so that the second conversion circuit 14 receives the second power P2 from the second connector 12. Moreover, as shown in FIG. 3 to FIG. 7, the electronic device 1 further includes an anti-thrust circuit 183 coupled between the second conversion circuit 14 and the node N.

In summary, according to the power management circuit, the electronic device, and the power supply method of the disclosure, a circuit architecture of the power management circuit is simple, and the first conversion circuit and the second conversion circuit are jointly coupled to the same node and share the same sensing circuit, so that production costs of the electronic device are reduced. In addition, settings for the first conversion circuit and the second conversion circuit to supply power to the system circuit and the battery unit are independent of each other, and the control circuit does not need to readjust the settings for the first conversion circuit and the second conversion circuit to supply power when the two connectors are connected to the two external power supplies. In this way, control on the first conversion circuit and the second conversion circuit is relatively simple. In application, a user of the electronic device also supplies power to the electronic device merely using the second power supply with a power transmission function without a need to carry an AC power adapter, thereby greatly improving a portability and convenience in use of the electronic device.

Although the disclosure is provided in the foregoing embodiments, the embodiments are not intended to limit the disclosure. Anyone having ordinary knowledge in the technical field makes some changes and refinements without departing from a spirit and scope of the disclosure. Therefore, protection scope of the disclosure is subject to scope defined by the attached claims.

What is claimed is:

1. A power management circuit applicable to an electronic device, comprising:

a first conversion circuit coupled between a first connector of the electronic device and a system circuit of the electronic device, where the first conversion circuit is coupled between the first connector and a battery unit of the electronic device via a node, and the first conversion circuit is configured to convert a first power from the first connector to supply power to the battery unit and the system circuit;

a second conversion circuit, coupled between a second connector and the system circuit of the electronic device, where the second conversion circuit is coupled between the second connector and the battery unit via the node, and the second conversion circuit is configured to convert a second power from the second connector to supply power to the battery unit and the system circuit;

a sensing circuit, coupled between the node and the battery unit; and a control circuit, coupled to the first connector, the second connector, the first conversion circuit, and the second conversion circuit, wherein when the first connector is connected to a first power supply to the electronic device and the second connector is connected to a second power supply to the electronic device, the control circuit controls the first conversion circuit to supply power to the system circuit, and controls the first conversion circuit to supply power to the battery unit according to a first fully-charged condition, and the control circuit computes a second fully-charged condition that is less than the first fully-charged condition; and when power information of the battery unit does not reach the second fully-charged condition, the control circuit controls the second conversion circuit to supply power to the system circuit and the battery unit according to the second fully-charged condition, so that the second conversion circuit and the first conversion circuit jointly supply power to the battery unit and the system circuit; wherein the control circuit further turns off the second conversion circuit when the power information of the battery unit reaches the second fully-charged condition, so that the second conversion circuit stops supplying power to the system circuit and the battery unit.

2. The power management circuit according to claim 1, wherein the control circuit comprises:

an embedded controller, configured to separately subtract a preset difference value from a fully-charged voltage value and a fully-charged current value comprised in the first fully-charged condition to generate the second fully-charged condition;

a first control chip coupled to the embedded controller for controlling the first conversion circuit to supply power to the system circuit and controlling the first conversion circuit to supply power to the battery according to the power information and the first fully-charged condition; and a second control chip coupled to the embedded controller for determining whether the power information reaches the second fully-charged condition, and controlling the second conversion circuit to supply power to the battery unit and the system circuit when the power information does not reach the second fully-charged condition.

3. The power management circuit according to claim 1, wherein the first power supply is an AC power adapter, the second power supply is a portable power adapter, the second connector supports a USB type-C communication interface, and the first conversion circuit comprises a buck converter, and the second conversion circuit comprises a buck-boost converter.

4. The power management circuit according to claim 1, wherein when the first connector is connected to the first power supply and the second connector is not connected to the second power supply, the control circuit controls the first conversion circuit to supply power to the system circuit, and the control circuit controls, according to the power information and the first fully-charged condition, the first conversion circuit to supply power to the battery unit; or when the first connector is not connected to the first power supply and the second connector is connected to the second power supply, the control circuit controls, according to the power information and the second fully-charged condition, the second conversion circuit to supply power to the battery unit and the system circuit.

5. The power management circuit according to claim 1, further comprising a power supply switch, wherein when the first connector is not connected to the first power supply, the power supply switch is turned on, and the power supply switch supplies a power from the battery unit to the system circuit; and when the first connector is not connected to the first power supply and the second connector is connected to the second power supply, the control circuit controls the power supply switch to be turned on, so that the second conversion circuit supplies power to the system circuit via the turned-on power supply switch.

6. An electronic device, comprising:
a battery unit, configured to output a battery power;
a first connector, configured to receive a first power from a first power supply;
a second connector, configured to receive a second power from a second power supply;
a system circuit, configured to operate according to any of the battery power, the first power, and the second power;
a first conversion circuit, coupled between the first connector and the system circuit, where the first conversion circuit is coupled between the first connector and the battery unit via a node, and the first conversion circuit is configured to convert the first power to supply power to the battery unit and the system circuit;
a second conversion circuit, coupled between the second connector and the system circuit, where the second conversion circuit is coupled between the second connector and the battery unit via the node, and the second conversion circuit is configured to convert the second power to supply power to the battery unit and the system circuit;
a sensing circuit, coupled between the node and the battery unit; and
a control circuit, coupled to the first connector, the second connector, the first conversion circuit, and the second conversion circuit;
wherein the control circuit is configured to:
control the first conversion circuit to supply power to the system circuit, and control the first conversion circuit to supply power to the battery unit according to a first fully-charged condition when the first connector is connected to the first power supply and the second connector is connected to the second power supply;
compute a second fully-charged condition that is less than the first fully-charged condition, and when power information of the battery unit does not reach the second fully-charged condition, the control circuit controlling the second conversion circuit to supply power to the system circuit and the battery unit according to the second fully-charged condition, so that the second conversion circuit and the first conversion circuit jointly supply power to the battery unit and the system circuit;
turn off the second conversion circuit when the power information of the battery unit reaches the second fully-charged condition, so that the second conversion circuit stops supplying power to the system circuit and the battery unit.

7. A power supply method applicable to an electronic device, comprising:
determining, by a control circuit, whether a first connector is connected to a first power supply to the electronic device and whether a second connector is connected to a second power supply to the electronic device;
controlling, by the control circuit, a first conversion circuit to convert a first power from the first connector according to a first fully-charged condition to supply power to a battery unit and a system circuit when the first connector is connected to the first power supply and the second connector is connected to the second power supply;
computing, by the control circuit, a second fully-charged condition that is less than the first fully-charged condition when the first connector is connected to the first power supply and the second connector is connected to the second power supply;
determining, by the control circuit, whether power information of the battery unit reaches the second fully-charged condition;
controlling, by the control circuit, a second conversion circuit to convert a second power from the second connector according to the second fully-charged condition when the power information does not reach the second fully-charged condition to supply power to the battery unit and the system circuit, so that the second conversion circuit and the first conversion circuit jointly supply power to the battery unit and the system circuit;
determining, by the control circuit, whether the power information reaches the second fully-charged condition after the second conversion circuit supplies power to the battery unit and the system circuit; and
controlling, by the control circuit, the second conversion circuit to stop supplying power to the battery unit and the system circuit when the power information reaches the second fully-charged condition after the second conversion circuit supplies power to the battery unit and the system circuit.

8. The power supply method according to claim 7, in the step of computing the fully-charged condition by the control circuit, the control circuit separately subtracts a preset difference value from a fully-charged voltage value and a fully-charged current value comprised in the first fully-charged condition to compute the second fully-charged condition.

9. The power supply method according to claim 7, further comprising:
determining, by the control circuit, whether the first connector is not connected to the first power supply and whether the second connector is connected to the second power supply;
computing, by the control circuit, the second fully-charged condition when the first connector is not connected to the first power supply and the second connector is connected to the second power supply;

controlling, by the control circuit, a power supply switch to be turned on when the first connector is not connected to the first power supply and the second connector is connected to the second power supply; and controlling, by the control circuit, the second conversion circuit to supply power to the system circuit and the battery unit via the power supply switch according to the second fully-charged condition.

10. The power supply method according to claim 9, further comprising:

determining, by the control circuit, whether the first connector is not connected to the first power supply and whether the second connector is not connected to the second power supply;

controlling, by the control circuit, the power supply switch to be turned on when the first connector is not connected to the first power supply and the second connector is not connected to the second power supply; and supplying power to the system circuit by the battery unit via the power supply switch.

* * * * *